Figure 1:
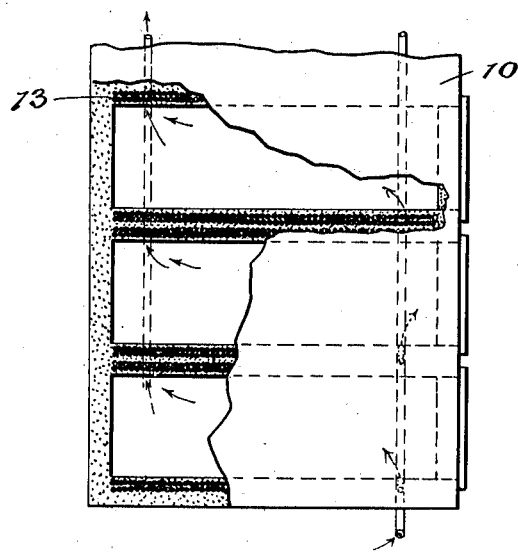

W. H. ALLEN.
METHOD OF DESICCATING.
APPLICATION FILED NOV. 4, 1911.

1,040,486.

Patented Oct. 8, 1912.

UNITED STATES PATENT OFFICE.

WILLIAM H. ALLEN, OF CLEVELAND, OHIO.

METHOD OF DESICCATING.

1,040,486.  Specification of Letters Patent.  Patented Oct. 8, 1912.

Application filed November 4, 1911. Serial No. 658,483.

*To all whom it may concern:*

Be it known that I, WILLIAM H. ALLEN, a citizen of the United States, residing at Cleveland, in the county of Cuyahoga and State of Ohio, have invented a certain new and useful Improvement in Methods of Desiccating, of which the following is a full, clear, and exact description.

This invention relates to a method of desiccating matter or substances, particularly organic animal or vegetable matter.

I have discovered that organic matter can under suitable conditions be completely dried or desiccated solely by the action of a magnetic field, and my invention in its broad aspect consists in the method which has for its main or essential step the subjecting of the substance to be treated to the action of the magnetic field for the purpose stated.

In view of the fact that desiccation is obtained without the occurrence of decay, I believe that decay germs are destroyed by the same agency which eliminates or carries away the water or moisture, but whether the destroying of the decay germs and desiccation result from the direct action of the magnetic field or from the indirect action, such as by the action of electrical currents induced in the substance treated, I do not know, nor do I regard it as a matter of any consequence.

The time required to accomplish the desiccation of any particular substance depends very largely on the character of the substance, such as its size and the amount of moisture contained therein, and also upon the strength of the magnetic field, less time being required when an intense magnetic field is employed than with a weaker field. Furthermore, I prefer to employ a changing magnetic field, that is one whose polarity is constantly changing, as results from an alternating current, or one which fluctuates in intensity such as results from the use of a direct current and an interrupter.

While the magnetic field is the principal, if not the sole agent which causes the desiccation, nevertheless, I find that the efficiency of the apparatus depends somewhat upon the character of the atmosphere, which surrounds the substance being treated. For example, I find that much better results are obtained if the atmosphere is fairly free from moisture and if it is maintained in cool condition. Moisture in the atmosphere immediately surrounding the object has a tendency to neutralize the desiccating action of the magnetic field and a warm temperature tends to promote decay. I therefore consider it part of my improved method to maintain a cool dry atmosphere around the substance subjected to the action of the magnetic field, and this I may accomplish either by a natural circulation or by a forced circulation of air which may be chemically or otherwise treated to place it in a cool dry condition.

My invention in its broad aspect may be applied for a variety of practical purposes, but one of the important uses to which it may be put is the desiccation of human bodies disposed or adapted to be disposed in burial crypts or mausoleums, the object being not only to preserve the body in a more or less natural condition, but to eliminate decay and the deleterious effects of the products of decomposition which are usually discharged into the atmosphere.

In applying my invention to this particular purpose, several modifications readily suggest themselves, for it is apparent that in a mausoleum, the bodies may be treated in a special desiccating compartment equipped with the necessary magnetic field producing apparatus, and after desiccation may be placed in the crypts in which the bodies are intended to repose, or the crypts themselves may be provided with the field producing apparatus, and the bodies may be placed in the crypts and desiccated therein.

Figure 2:
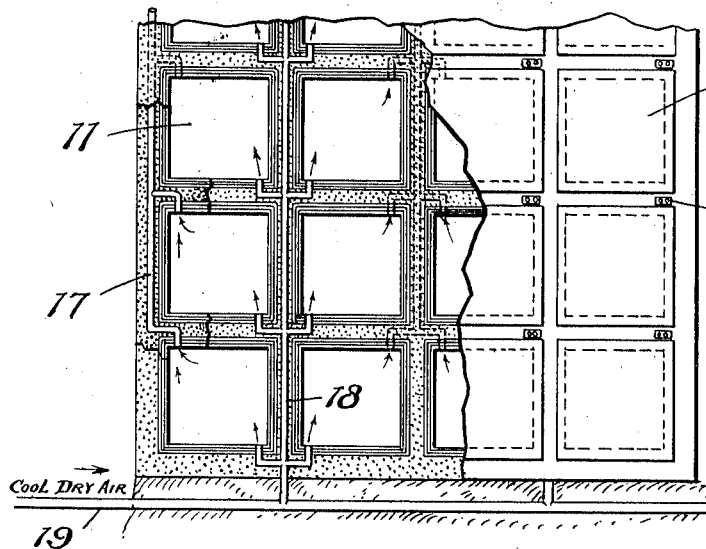
Figure 3:
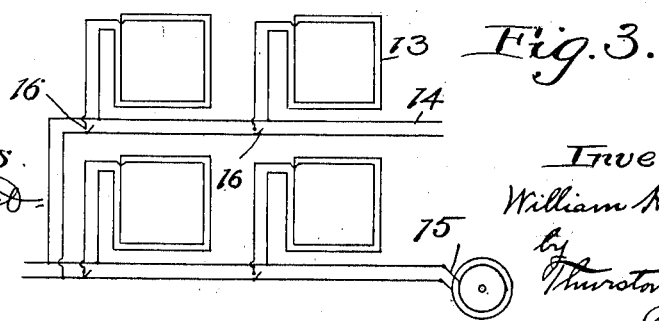

In the drawings, I have illustrated the apparatus adapted to carry out the last mentioned method, and in the drawings, Figure 1 is a side view of a portion of a mausoleum construction illustrating a vertical row of crypts equipped with the apparatus for the purpose stated, portions being broken away and in section. Fig. 2 is a front view of the same with portions broken away and in section, and Fig. 3 is a diagrammatic view illustrating the wiring of the crypts and the method of producing the magnetic fields therein.

The mausoleum 10 may be built of any suitable material and in any form, but as here shown, the crypts 11 are arranged in both horizontal and vertical rows or tiers, these crypts being in the shape of oblong compartments which at the front are provided with doors 12 adapted to be closed and fastened or sealed in any desired manner. According to the present invention, I propose to send through each crypt compartment a magnetic field so that the lines of force will pass through the body placed therein, and while it will be obvious that the arrangement of coils for the production of the field and the direction in which the lines of force pass may be varied considerably, I have shown each crypt compartment enveloped by coils 13 embedded or otherwise placed in the side, top and bottom walls of the crypt. The coil may be in the form of a single layer extending from one end of the crypt compartment to the other, or there may be a plurality of layers, as is found desirable. The conductors are preferably insulated, one from the other, and the size of the conductors will be such that the ohmic resistance and the heat produced by the current passing through the coils will be as low as is possible with the intensity of field required to desiccate the bodies. These coils 13 of each row of crypts may be connected in parallel to groups of main current carrying conductors 14, suitably embedded in the walls of the mausoleum, and those conductors will in turn be connected to some suitable source of alternating current 15. The coils may be cut in or out of circuit by means of switches 16, which may be arranged for convenient manipulation on the wall of the mausoleum, adjacent the doors 12. This is indicated clearly in Fig. 2. It will be understood that normally the coils are cut out of circuit by means of the switches 16, and that after a body is placed in the crypts, the particular coil for that crypt is cut into circuit, so as to produce the desiccating action and may continue in circuit for the required length of time, after which it will be cut out, and need no longer be used.

To carry away the moisture of the body or the products resulting from decomposition of the moisture, and in fact to promote a circulation of air of the desired character, each crypt has a connection with an outlet pipe 17, which may extend to the top of the mausoleum structure. The connection with each of these pipes 17 is preferably near the upper part of the crypt. Each crypt also has a connection with a branch inlet pipe 18, which is connected to a main pipe 19 through which may be supplied cool dry air. The air which is thus supplied may be treated in any suitable manner to get it into the proper condition as regards humidity and temperature to produce the best results for desiccation, and while I have made no attempt to show all the details for supplying to or carrying away air from the crypts, it will be understood that in practice, the passage of air to and from the various crypts may be controlled by such valves as are found to be desirable.

Having thus described my invention, what I claim is:

1. The method of desiccating an organic substance which consists in subjecting the same to the action of a magnetic field.

2. The method of desiccating an organic substance which consists in subjecting the same to the action of a changing or alternating magnetic field.

3. The method of desiccating an organic substance which consists in subjecting the same to the action of a magnetic field in a dry atmosphere.

4. The method of desiccating an organic substance which consists in subjecting the substance to the action of a magnetic field in a cool dry atmosphere.

5. The method of desiccating a substance in a compartment, which consists in subjecting the substance to the action of a magnetic field, and maintaining through the compartment a circulation of cool dry air.

In testimony whereof, I hereunto affix my signature in the presence of two witnesses.

WILLIAM H. ALLEN.

Witnesses:
 A. F. KWIS,
 LESLIE O. CARR, Sr.